United States Patent

Zuckerman et al.

[15] 3,676,334

[45] July 11, 1972

[54] WASTEWATER TREATMENT SEQUENCE

[72] Inventors: Mathew M. Zuckerman, Yonkers; Alan H. Molof, New City, both of N.Y.

[73] Assignee: Envirotech Corporation, Palo Alto, Calif.

[22] Filed: May 14, 1969

[21] Appl. No.: 824,709

Related U.S. Application Data

[63] Continuation-in-part of Ser. No. 768,378, Oct. 17, 1968.

[52] U.S. Cl. ...................................210/9, 210/11, 210/18, 210/27, 210/64

[51] Int. Cl. ...........................................C02c 5/02

[58] Field of Search ...................210/1, 9, 18, 42, 49, 59, 74, 210/149, 195, 253–254, 27, 28, 36, 39, 40, 64, 11

[56] References Cited

UNITED STATES PATENTS

| | | | |
|---|---|---|---|
| 2,044,582 | 6/1936 | Lykken et al. | 210/74 X |
| 2,137,986 | 11/1938 | Rankin | 210/253 X |
| 2,196,991 | 4/1940 | Jacobs et al. | 210/149 X |
| 3,242,055 | 3/1966 | De Lucia | 210/11 X |
| 3,377,271 | 4/1968 | Cann | 210/18 X |
| 3,398,088 | 8/1968 | Okey | 210/18 X |
| 3,487,937 | 1/1970 | Koulovatos | 210/195 |
| 1,928,398 | 9/1933 | Urbain | 210/28 |
| 2,171,199 | 8/1939 | Urbain et al. | 210/29 |
| 3,347,786 | 10/1967 | Baer et al. | 210/39 X |
| 3,408,289 | 10/1968 | Gustafson | 210/27 |
| 3,455,820 | 7/1969 | Joyce et al. | 210/40 |

OTHER PUBLICATIONS

Chemical Treatment of Sewage, Report of Committee on Sewage Disposal, Americal Public Health Association, Presented at the 64th Annual Meeting in Milwaukee, Wisc., Oct. 8, 1935, pp. 44–53

McKinney, R. E., Biological Oxidation of Organic Matter, Appearing in Advances in Biological Waste Treatment, Edited by W. W. Eckenfelder, Jr. et al., MacMillan Co., N.Y., 1963, pp. 1–10 (P.O.S.L.)

Primary Examiner—Michael Rogers
Attorney—Richard F. Bojanowski and Robert R. Finch

[57] ABSTRACT

An improved process for treating wastewater is based on a pre-treatment to convert high molecular weight soluble organic material in raw wastewater into organic material of low molecular weight. Following this conversion, the wastewater is treated with a process sequence tailored to effluent quality requirements. One such sequence may include, for example, the steps of physical or biological adsorption, solids removal, membrane filtration, and disinfection.

20 Claims, No Drawings

WASTEWATER TREATMENT SEQUENCE

This application is a continuation-in-part of U.S. Pat. application Ser. No. 768,378, entitled "Wastewater Treatment Process," filed on Oct. 17, 1968, in the names of Matthew M. Zuckerman and Alan H. Molof.

This invention relates generally to wastewater treatment and more specifically to an improved process for treating raw wastewater by a novel treatment sequence adapted to control the molecular weight distribution of soluble organic material in raw wastewater so as to optimize processing in accordance with effluent quality requirements.

Wastewater derived from municipal sewage systems or industrial processes generally comprises a very complex mixture of soluble and insoluble organic and inorganic contaminants. Treating such wastewater to produce an effluent water of a suitable quality for release into rivers or other depositories or for possible re-use involves removing a portion of these contaminants, with the degree of removal required being determined by the place of release or the re-use objective. Processing such wastewater efficiently, at reasonable cost, and with a consistent degree of removal has presented a serious problem.

Conventional wastewater treatment processes are termed preliminary treatment, primary treatment, secondary treatment and tertiary treatment. The highest effluent quality is currently obtained by utilizing a treatment sequence consisting of all of these treatment processes.

Preliminary treatment normally comprises the removal of large objects in the wastewater on a bar screen or other suitable device, and removal of suspended inorganic material in a grit chamber.

Primary treatment is designed to remove settleable solids by sedimentation. Sedimentation tanks suitable for this purpose are well known in the art. Such tanks are adapted to receive wastewater and to retain the wastewater for a sufficient period of time to permit solid material to settle, with sludge or concentrated settleable solids being removed from the bottom of the tank and the clarified liquid being removed from the top of the tank.

Secondary treatment usually comprises one of two biological treatment processes; trickling filter treatment or activated sludge treatment. In the trickling filter process, the primary treated wastewater is sprayed over a bed of rocks or plasticized support media on which bacteria have been permitted to grow. The bacteria adsorb portions of the organic material from the wastewater as it flows by and later oxidize this material by exposure to air. In the activated sludge process, the wastewater flows into long and narrow aerated tanks where bacteria are permitted to grow in flocs or clusters onto which the organic material in the waste is adsorbed and eventually metabolized. The waste then flows into a settling tank, where the bacteria flocs settle for return to the aeration tank, while clarified wastewater flows out the tank top.

Tertiary treatment produces the highest quality effluent water by treating a secondary effluent by chemical additions which remove colloidal and suspended solids and often phosphates. Such chemical addition may be followed by ammonia stripping wherein air is blown through the wastewater at a high pH causing removal of nitrogen in the solution as ammonia gas. Ammonia stripping may be followed by pH adjustment and sand filtration for removal of any residual suspended solids followed by activated carbon adsorption for removal of soluble organic material, followed by chlorination for killing of pathogenic organisms and finally reverse osmosis for removal of soluble inorganic material.

A significant disadvantage of the production of high quality effluent water by conventional treatment processes is the high cost of increasing the percentage of contaminant removal at high levels and the overall inefficiency of these processes at high levels. The inefficiency results from the fact that conventional treatment sequences do not take into account the molecular composition of wastewater, nor do they control this composition to increase the efficiency and effectiveness of wastewater processing.

It is known that the average wastewater contains a distribution of soluble organic molecules of various molecular weights. It has been determined that the distribution of molecular weights in such wastewater is not uniform, and that most molecules fall in an upper molecular weight range and a lower molecular weight range. It has also been determined that the presence of a large quantity of high molecular weight soluble organic molecules adversely affects the treatment of wastewater in numerous ways to be discussed hereinafter.

It is thus an object of the present invention to process raw wastewater more efficiently than has heretofore been possible; and specifically, to do so by employing a wastewater treatment sequence which controls the molecular weight distribution of soluble organic material in the wastewater. Related objects of this invention are to reduce the time of wastewater treatment and to provide a wastewater treatment sequence which produces a high quality effluent water at reduced cost.

A further difficulty encountered in conventional wastewater treatment is the variability of effluent quality. In higher quality treatment sequences, where it is anticipated that the processed wastewater will be re-used, consistency of quality of the output water is of great importance. Treatment sequences, even those employing the most sophisticated tertiary treatment, do not produce consistent quality results. It is thus a further object of the present invention to provide a wastewater treatment sequence that will consistently produce an effluent water of any desired quality. A related object of the invention is to provide a process that can utilize physical and/or biological adsorption in various proportions to obtain a consistent quality effluent water with any desired degree of removal.

A further object of this invention is to treat wastewater by a process that can produce a water low in inorganic dissolved solids and suspended and colloidal organic solids, but still containing some soluble organic material.

A wastewater treatment sequence demonstrating the objects and features of the present invention comprises the steps of converting high molecular weight soluble organic material in the wastewater to organic material of low molecular weight and removing at least a part of the low molecular weight organic material by a process adapted to produce a desired effluent water quality.

Referring now in detail to presently preferred embodiments in accordance with the present invention, the process described herein is intended to upgrade the quality of any water by removing undesirable materials. This primarily would relate to raw wastewater of domestic and/or industrial origin or storm water runoff, and would also have application in what would be considered non-waste treatment practices. As used herein, raw wastewater means wastewater that has not been treated by biological treatment processes conventionally employed in secondary or tertiary treatment. It is anticipated that the wastewater treated by the present process may, for example, have large objects and suspended inorganic material such as grit removed by preliminary treatment in conventional apparatus or have suspended solids partially removed by such processes as plain sedimentation or coagulation.

A basic element of the present inventive process is the conversion of high molecular weight organic material to organic material of low molecular weight. In this process, for example, the high molecular weight proteins and polysaccharides which characterize wastewater are broken down into their components such as amino acids and mono or disaccharides. It has been found that these smaller particles are removed from wastewater by adsorption or other means much more easily than the larger particles. This results in part from the fact that smaller molecular weight particles can gain access to the interior pores of physical adsorption materials and to the interior of biological cells. It is thus possible to select a treatment sequence following the conversion step which will produce an effluent water of any desired quality. In addition, it has been determined that the variableness of effluent quality in conventional treatment sequences is in large part due to the variability in the molecular size of the soluble organic material. By pretreating raw wastewater to create a more uniform molecular size, the present invention insures consistent effluent quality.

In a presently preferred embodiment of the invention, the conversion of high molecular weight organic material is accomplished by hydrolyzing the wastewater solution by pH adjustment and retention. In one method of hydrolysis, the raw wastewater is conducted into a detention tank where appropriate chemicals, such as lime in the form of calcium hydroxide, are added and where the wastewater is retained for a period sufficient to permit hydrolysis to occur. In other embodiments pH adjustment may be accomplished by passing the wastewater through a bed of pH adjusting chemicals in solid form or electrolytically. Additionally, high molecular weight material may be broken down by enzyme additions. The detention time required for hydrolysis is dependent upon the degree of pH adjustment employed or the quantity of enzyme additions. For example, if calcium hydroxide is added to a wastewater solution to raise the pH to 11.2, a possible detention time would be 60 minutes. Detention may be accomplished in the conventional way, with a continuous input to a detention tank and continuous output from the tank timed so as to hold the wastewater for average time equal to the selected detention time.

In accomplishing hydrolysis, pH adjustment and detention may be aided by simultaneous addition of external energy either in the form of temperature and/or pressure adjustments or in other forms such as use of high frequency energy such as ultrasonics. Each of these additions have the effect of expediting the breakdown of high molecular weight organic material and, in a preferred embodiment of the invention, temperature, pressure and other conditions are selected so as to minimize the required detention time.

The treatment sequence following hydrolysis is selected in accordance with the desired effluent quality and in a presently preferred embodiment of the invention includes adsorption of soluble organic material by physical and/or biological means. Processes for accomplishing physical or biological adsorption of soluble organic material in wastewater are well known in the wastewater treatment art. An exemplary physical adsorption process involves passing the wastewater through a bed of activated carbon or a similar adsorption material. A biological adsorption process would involve passing wastewater over a biological slime layer where either the wastewater can move relative to the slime layer or the slime layer can move relative to the wastewater or both the slime and the wastewater can move together. An exemplary biological adsorption process involves passing the wastewater through trickling filter or activated sludge treatments referred to above. It is to be understood that adsorption may be preceded by readjustment of the wastewater pH by recarbonation, acid additions or other means.

It is to be understood that physical and biological adsorption may both be used in the same process, either serially with biological adsorption of at least a portion of the soluble organic material preceding physical adsorption, or in parallel. Parallel physical and biological adsorption is adapted to produce a specific desired effluent quality. This is accomplished by dividing the hydrolyzed wastewater into two segments and treating one segment physically while treating the other biologically. By varying the proportion in which physical and biological adsorption are employed, it is possible to produce an effluent water of any desired quality within a certain quality range.

In addition to hydrolysis and organic adsorption, the wastewater may be treated for removal of colloidal and suspended solids and nutrient materials such as phosphates. This may be accomplished simultaneously with hydrolysis such as the case where appropriate pH adjusting chemicals are employed. For example, if calcium hydroxide is used to adjust the wastewater pH, colloidal and suspended solids and phosphates may be removed as sludge from the wastewater. The detention tank provided for hydrolysis may be specifically adapted to permit the removal of sludge from the bottom of the tank and the removal of clarified wastewater from the top of the tank. Alternately, solids may be removed before or after hydrolysis as desired. In this case solids removal can be accomplished by the addition of other chemicals specifically added for solids removal or by a separate device such as a filter bed of sand, anthracite coal or other suitable material.

The treatment sequence of hydrolysis followed by biological and/or physical adsorption removes soluble and suspended organic material to such a low level that inorganic removal processes, such as those utilizing membranes or ion exchange resins become substantially more economical. For example, membrane inorganic removal processes such as reverse osmosis and electrodialysis are made more economical because the operational life of the membranes are extended by elimination of clogging due to suspended material and fouling due to biological growth which is dependent on the presence of organic material. Other inorganic removal processes would benefit from this treatment including distillation. Other advantages would result from increased utilization of membranes for specific water use applications such a pyrogen-free water. Thus an additional alternative process in accordance with the invention would comprise hydrolysis with or without solids removal, followed by physical or biological adsorption followed by removal of inorganic material.

It is to be understood that numerous additional combinations of treatment steps may be employed in the treatment sequence following hydrolysis. For example, where organic removal is not required, hydrolysis may be followed directly by removal of at least a part of the inorganic soluble material in the wastewater by filtration or otherwise. Similarly, hydrolysis may be followed by removal of suspended solids and then membrane filtration. Again, hydrolysis may be followed by deactivation of microorganisms in the wastewater either by means of chemical additions in a contact process or energy additions in a non-contact process. Examples of such chemical additions are chlorine, ozone, bromine, etc. whereas examples of such energy additions are ultraviolet light, ultrasonics, gamma radiation, etc.

It is to be understood that in each of the possible treatment sequences referred to herein, any one step in the sequence may be partially by-passed so as to effectively reduce the degree to which that step operates in the process. For example, in a treatment sequence comprising hydrolysis, physical adsorption and membrane filtration, it may be desirable to filter only a portion of the wastewater to be processed so as to remove a smaller percentage of inorganic material from the overall effluent.

The hydrolysis step of the present treatment sequence can be accomplished by treating the entire wastewater flow or by splitting the flow in a treatment process referred to herein as hydrolysis contact.

In the hydrolysis contact process, the raw wastewater stream entering the treatment sequence is divided into a primary wastewater segment and a secondary wastewater segment. The proportion between the primary and secondary segment may be selected in accordance with the degree of hydrolysis required. The wastewater in the primary segment is hydrolyzed by any one of the methods disclosed above so that high molecular weight soluble organic material in the primary segment is converted to organic material of low molecular weight. A selected portion of the produce of hydrolysis in the primary wastewater segment is thus removed and is mixed with the secondary wastewater segment. The selected portion removed may comprise the sludge and/or part of the supernatent from the primary segment. The combination of secondary wastewater segment and removed produce provides a secondary utilization of the hydrolysis agents and allows more complete utilization of these agents.

The primary and secondary wastewater segments from the hydrolysis contact process may then be combined and treated together by a selected treatment sequence according to the desired effluent quality, or, the first wastewater segment may be treated with a first treatment procedure (such as physical adsorption) and the second wastewater segment may be treated with a second treatment procedure (such as biological adsorption) and the effluent of these treatment steps may then be combined to produce the effluent water.

It is to be understood that the above described arrangements are merely examples of the application of the principles of the invention. Additional embodiments will be devised by those skilled in the art without departing from the spirit or scope of the invention.

We claim:

1. A process for treating raw wastewater containing a soluble fraction which includes soluble high molecular weight organic materials such as proteins and polysaccharides comprising the steps of:
   a. introducing said raw wastewater into a first treatment zone;
   b. subjecting said raw wastewater in said first treatment zone to hydrolyzing conditions such that substantially all of said soluble high molecular weight organic materials are reduced in size to yield a wastewater containing a preponderance of low molecular weight soluble organic materials such as amino acids and mono and disaccharides;
   c. removing said wastewater from said first treatment zone and, subsequently,
   d. subjecting said wastewater containing said low molecular weight material to biological treatment such that substantially all of said low molecular weight soluble organic materials are separated therefrom.

2. A process according to claim 1 wherein the soluble fraction includes inorganic soluble materials and wherein said process includes a step for removing at least part of said soluble inorganic materials.

3. A process according to claim 1 wherein step (d) comprises contacting said wastewater removed from said first treatment zone with a biological slime.

4. A process according to claim 1 wherein step (d) comprises passing said wastewater removed from said first treatment zone over a trickling filter.

5. A process according to claim 1 wherein step (d) comprises the steps of:
   $d_1$. dividing said wastewater into first and second wastewater segments;
   $d_2$. physically adsorbing at least part of said low molecular weight organic material in said first wastewater segment by passing at least a portion of said first wastewater segment over a physical adsorption material, and
   $d_3$. biologically adsorbing at least part of said low molecular weight material in said second wastewater segment by passing at least a portion of said second wastewater segment over a biological adsorption surface.

6. A process according to claim 1 wherein step (b) comprises hydrolyzing said soluble organic high molecular weight material to soluble low molecular weight materials by chemical means.

7. A process for treating raw wastewater according to claim 1 wherein step (b) comprises:
   $b_1$. adjusting the pH of said wastewater to induce hydrolysis of said high molecular weight materials, and
   $b_2$. retaining said raw wastewater at a pre-selected temperature and pressure for a period of time sufficient to substantially complete said hydrolysis.

8. A process for treating raw wastewater according to claim 1 wherein step (b) comprises hydrolyzing said high molecular weight materials by enzymatic means.

9. A process for treating raw wastewater according to claim 8 wherein the step of hydrolyzing comprises:
   $b_1$. adding to said raw wastewater and enzymatic material containing proteases and carbohydrases under conditions sufficient to cause substantially all of said soluble high molecular weight organic material to low molecular weight soluble organic materials.

10. A process for treating raw wastewater according to claim 1, further including the step of deactivating micro-organisms present in said wastewater by chemical means.

11. A process for treating raw wastewater according to claim 1 further including the step of deactivating micro-organisms present in said wastewater by applying energy thereto.

12. A process for treating raw wastewater containing a soluble fraction which includes soluble high molecular weight organic materials such as proteins and polysaccharides comprising:
   a. dividing said raw wastewater stream into a primary wastewater segment and a secondary wastewater segment;
   b. hydrolyzing said primary wastewater segment so that substantially all of the high molecular weight soluble organic material is substantially converted to soluble organic material of low molecular weight such as amino acids and mono and disaccharides;
   c. removing a selected portion of said soluble organic low molecular weight material from said primary wastewater segment, and
   d. combining the product of (c) with said secondary wastewater segment.

13. A process for treating raw wastewater according to claim 12, including the step of removing suspended solids from said raw wastewater.

14. A process for treating raw wastewater containing a soluble fraction which includes soluble high molecular weight materials such as proteins and polysaccharides and soluble inorganic materials comprising the steps of:
   a. introducing said raw wastewater into a first treatment zone;
   b. subjecting said raw wastewater in said first treatment zone hydrolyzing conditions such that substantially all of said high molecular weight soluble organic materials as reduced in size to yield a wastewater containing a preponderance of soluble organic materials of low molecular weight such as amino acids and mono and disaccharides;
   c. subjecting said wastewater of (b) to a second treatment zone wherein at least part of the inorganic soluble material is removed.

15. A process for treating raw wastewater according to claim 14 wherein step (c) comprises passing said wastewater through a membrane for separating said soluble inorganic material therefrom.

16. A process for treating raw wastewater as defined in claim 14 further including the step of removing suspended solids from said wastewater.

17. A process for treating raw wastewater containing microorganisms and soluble high molecular weight materials such as proteins and polysaccharides comprising the steps of:
   a. hydrolyzing said raw wastewater so that substantially all of said high molecular weight soluble organic materials in said raw wastewater are converted to organic materials of low molecular weight such as amino acids and mono and disaccharides, and
   b. deactivating at least a portion of said micro-organisms in said raw wastewater.

18. A process for treating raw wastewater according to claim 17 including the step of removing suspended solids from said raw wastewater.

19. A process for treating raw wastewater in accordance with claim 17 wherein step (b) comprises adding chemicals to said raw wastewater for deactivating said micro-organisms present therein.

20. A process for treating raw wastewater according to claim 17 wherein step (b) comprises applying energy to said raw wastewater to deactivate said micro-organisms present therein.

* * * * *